United States Patent
Chatterjee et al.

(10) Patent No.: US 11,935,087 B2
(45) Date of Patent: *Mar. 19, 2024

(54) UTILIZING PAYMENT TOKENS TO TRACK REWARDS

(71) Applicant: PAYPAL, INC., San Jose, CA (US)

(72) Inventors: Avik Chatterjee, Phoenix, AZ (US); Srivathsan Narasimhan, Saratoga, CA (US)

(73) Assignee: PAYPAL, INC., San Jose, CA (US)

(*) Notice: Subject to any disclaimer, the term of this patent is extended or adjusted under 35 U.S.C. 154(b) by 353 days.

This patent is subject to a terminal disclaimer.

(21) Appl. No.: 17/021,356

(22) Filed: Sep. 15, 2020

(65) Prior Publication Data

US 2021/0056579 A1 Feb. 25, 2021

Related U.S. Application Data

(63) Continuation of application No. 15/464,831, filed on Mar. 21, 2017, now Pat. No. 10,776,808.

(51) Int. Cl.
*G06Q 30/00* (2023.01)
*G06Q 20/38* (2012.01)
(Continued)

(52) U.S. Cl.
CPC ....... *G06Q 30/0229* (2013.01); *G06Q 20/385* (2013.01); *G06Q 20/387* (2013.01); *G06Q 20/405* (2013.01)

(58) Field of Classification Search
None
See application file for complete search history.

(56) References Cited

U.S. PATENT DOCUMENTS

| | | | | |
|---|---|---|---|---|
| 7,480,806 B2 * | 1/2009 | Grawrock | ............. | H04L 63/123 |
| | | | | 713/185 |
| 7,660,737 B1 * | 2/2010 | Lim | ....................... | G06Q 30/02 |
| | | | | 705/14.49 |

(Continued)

FOREIGN PATENT DOCUMENTS

| | | | | |
|---|---|---|---|---|
| JP | 2010239620 | | 10/2010 | |
| JP | 2010239620 A | * | 10/2010 | ........... H04L 67/104 |

(Continued)

OTHER PUBLICATIONS

Deloitte. Making blockchain real for customer loyalty rewards programs. (Oct. 12, 2016). Retrieved online May 4, 2020. https://www2.deloitte.com/content/dam/Deloitte/us/Documents/financial-services/us-fsi-making-blockchain-real-for-loyalty-rewards-programs.pdf (Year: 2016).*

(Continued)

*Primary Examiner* — James A Reagan
(74) *Attorney, Agent, or Firm* — HAYNES AND BOONE, LLP

(57) ABSTRACT

A computer system detects the reception of a first token associated with a first transaction. The computer system determines that a first Payments Reward Identifier (PRI) is associated with the first token by accessing a PRI database. In response to determining that the first PRI is associated with the first token, the computer system accesses the PRI database and determines that the first PRI is associated with a record within the PRI database that corresponds to a first rewards ID (RID). In response to determining that the first PRI is associated with a record within the PRI database that corresponds to the first rewards, the computer system determines a first rewards amount corresponding to the first transaction, and updates a total rewards amount, in a rewards (Continued)

database, corresponding to the determined first RID based on the first rewards amount.

20 Claims, 7 Drawing Sheets

(51) Int. Cl.
*G06Q 20/40* (2012.01)
*G06Q 30/0226* (2023.01)

(56) References Cited

U.S. PATENT DOCUMENTS

| | | | |
|---|---|---|---|
| 7,740,171 B2* | 6/2010 | Kingsborough | G06Q 30/0241 705/64 |
| 7,815,107 B2* | 10/2010 | Kingsborough | G06Q 30/0226 705/64 |
| 7,953,630 B2* | 5/2011 | Fowler | G06Q 30/02 705/14.3 |
| 8,449,379 B2* | 5/2013 | Rowe | G07F 17/3258 463/25 |
| 8,706,624 B2* | 4/2014 | Don | G06Q 40/03 705/40 |
| 9,836,759 B2* | 12/2017 | Georgi | G06Q 30/0229 |
| 9,978,078 B2* | 5/2018 | Georgoff | G06Q 30/0257 |
| 10,121,129 B2* | 11/2018 | Kalgi | G06Q 20/386 |
| 10,296,887 B2* | 5/2019 | Kingsborough | G06Q 30/0234 |
| 10,510,057 B2* | 12/2019 | Priebatsch | G06Q 20/3672 |
| 10,776,808 B2* | 9/2020 | Chatterjee | G06Q 20/387 |
| 10,803,449 B2* | 10/2020 | Kalgi | G06Q 30/0601 |
| 10,853,835 B2* | 12/2020 | Priebatsch | G06Q 20/202 |
| 10,909,568 B2* | 2/2021 | Georgoff | G06Q 30/0257 |
| 11,010,753 B2* | 5/2021 | Kalgi | G06Q 20/3226 |
| 11,488,197 B2* | 11/2022 | Priebatsch | G06Q 20/3224 |
| 2003/0163711 A1* | 8/2003 | Grawrock | G06F 21/57 713/189 |
| 2004/0098306 A1* | 5/2004 | Fitzpatrick | G06Q 30/0217 705/14.13 |
| 2006/0040736 A1* | 2/2006 | Baerlocher | G07F 17/3216 463/27 |
| 2006/0069619 A1* | 3/2006 | Walker | G06Q 30/02 705/14.27 |
| 2006/0247035 A1* | 11/2006 | Rowe | G07F 17/3258 463/26 |
| 2007/0022008 A1* | 1/2007 | Kingsborough | G06Q 20/387 705/14.4 |
| 2007/0022046 A1* | 1/2007 | Kingsborough | G06Q 30/0234 705/40 |
| 2007/0022047 A1* | 1/2007 | Kingsborough | G06Q 20/382 705/40 |
| 2007/0022048 A1* | 1/2007 | Kingsborough | G06Q 20/382 705/40 |
| 2007/0060274 A1* | 3/2007 | Rowe | G07F 17/3237 463/16 |
| 2009/0259547 A1* | 10/2009 | Clopp | G06Q 30/02 705/14.16 |
| 2009/0276305 A1* | 11/2009 | Clopp | G06Q 30/0214 705/14.16 |
| 2012/0271770 A1* | 10/2012 | Harris | G06Q 20/00 705/65 |
| 2013/0013499 A1* | 1/2013 | Kalgi | G06Q 20/36 705/41 |
| 2013/0024364 A1* | 1/2013 | Shrivastava | G06Q 20/12 705/39 |
| 2013/0036001 A1* | 2/2013 | Wegner | G06Q 30/02 705/14.31 |
| 2013/0124273 A1* | 5/2013 | Chhabra | G06Q 30/0215 705/14.3 |
| 2013/0173448 A1* | 7/2013 | Don | G06Q 20/02 705/38 |
| 2013/0191204 A1* | 7/2013 | Kingsborough | G06Q 20/102 705/16 |
| 2013/0325579 A1* | 12/2013 | Salmon | G06Q 30/0228 705/14.29 |
| 2013/0339124 A1* | 12/2013 | Postrel | G06Q 30/0233 705/14.33 |
| 2014/0108125 A1* | 4/2014 | Maraz | G06Q 30/0239 705/14.39 |
| 2014/0207654 A1* | 7/2014 | Don | G06Q 20/102 705/38 |
| 2014/0358786 A1* | 12/2014 | Van Heerden | G06Q 20/3821 705/44 |
| 2015/0088607 A1* | 3/2015 | Georgoff | G06Q 30/0246 705/14.46 |
| 2015/0278946 A1* | 10/2015 | Don | G06Q 20/12 705/38 |
| 2015/0278947 A1* | 10/2015 | Don | G06Q 20/24 705/38 |
| 2015/0278948 A1* | 10/2015 | Don | G06Q 40/03 705/38 |
| 2015/0278949 A1* | 10/2015 | Don | G06Q 20/12 705/38 |
| 2016/0012465 A1* | 1/2016 | Sharp | G06Q 20/321 705/14.17 |
| 2016/0019536 A1* | 1/2016 | Ortiz | G06Q 20/36 705/67 |
| 2016/0364713 A1* | 12/2016 | Kingsborough | G06Q 30/0226 |
| 2016/0371668 A1* | 12/2016 | Priebatsch | G06Q 20/348 |
| 2017/0193543 A1* | 7/2017 | Priebatsch | G06Q 30/0238 |
| 2017/0243199 A1* | 8/2017 | Kalgi | G06Q 20/20 |
| 2017/0286958 A1* | 10/2017 | Herman | G06Q 20/4015 |
| 2018/0240148 A1* | 8/2018 | Georgoff | G06Q 30/0257 |
| 2018/0276654 A1* | 9/2018 | Chatterjee | G06Q 20/385 |
| 2019/0026729 A1* | 1/2019 | Kalgi | G06Q 20/3276 |
| 2020/0074544 A1* | 3/2020 | Don | G06Q 20/102 |
| 2021/0012313 A1* | 1/2021 | Don | G06Q 20/24 |
| 2021/0042783 A1* | 2/2021 | Priebatsch | G06Q 20/3224 |
| 2021/0056579 A1* | 2/2021 | Chatterjee | G06Q 20/405 |
| 2021/0158392 A1* | 5/2021 | Georgoff | G06Q 30/0246 |
| 2021/0272101 A1* | 9/2021 | Kalgi | G06Q 20/325 |

FOREIGN PATENT DOCUMENTS

| | | | | |
|---|---|---|---|---|
| JP | 2015039486 | | 3/2015 | |
| JP | 2015039486 A | * | 3/2015 | A63F 13/46 |
| WO | WO 2005015461 | | 2/2005 | |
| WO | WO-2005015461 A1 | * | 2/2005 | G06Q 30/0226 |

OTHER PUBLICATIONS

Woodward, Kevin. The Tug of War Over Tokenization. (Dec. 1, 2014). Retrieved online May 4, 2020. http://www.digitaltransactions.net/magazine_articles/the-tug-of-war-over-tokenization/ (Year: 2014).*
Visa. Card Acceptance Guidelines for Visa Merchants. (Feb. 20, 2017). Retrieved online May 4, 2020. https://usa.visa.com/dam/VCOM/global/support-legal/documents/card-acceptance-guidelines-visa-merchants.pdf (Year: 2017).*

* cited by examiner

| PRI ID | Rewards ID | RPI(s) | Token # |
|---|---|---|---|
| 9521 | 1152 | 36363 | 54AB, 541BK, 6789KB |
| 9522 | 10901 | 1412, 1551, 1554 | 99102BK, 541BK, 6789KB |
| 9523 | 1154 | 36363 | 33321GN, 33421GG |
| 9524 | 1155 | 36363 | 90921KGB, 87712KJK |
| 9525 | 91019 | 54678 | 5124AB23, OP92BK1, 00931KBO |

FIG. 5

| Rewards ID | Rewards Accrued |
|---|---|
| 1152 | 20,000 |
| 10901 | 1302,44 |
| 1154 | 1020 |
| 1155 | 5600 |
| 91019 | 7688 |

FIG. 6

UTILIZING PAYMENT TOKENS TO TRACK REWARDS

CROSS REFERENCED TO RELATED APPLICATIONS

This application claims priority to and is a continuation of U.S. patent application Ser. No. 15/464,831, filed on Mar. 21, 2017, now issued as U.S. Pat. No. 10,776,808 on Sep. 15, 2020, the contents of which is incorporated herein by reference in its entirety.

TECHNICAL FIELD

The present disclosure relates generally to payment tokens, and more particularly to tracking rewards associated with tokenized transactions originating in a digital wallet by utilizing an identifier.

BACKGROUND

Tokenization has become a widely-used mechanism for processing payment transactions securely. In a typical tokenization scheme, sensitive data such as financial instrument data, is replaced with a randomly generated unique identifier called a 'token'. During a payment transaction, this unique token is used instead of the financial instrument data. This new level of indirection prevents unauthorized parties from reverse engineering or guessing the details of the financial instrument utilized in a payment transaction. Even if the token is compromised, in many cases, it can only be utilized by a fraudster in a limited fashion, thus reducing the adverse consequences of such an exposure. For example, in case of a financial instrument such as a Credit or a Debit Card, the cardholder's primary account number (PAN) is replaced with a unique token that may retain many of the required transactional properties of the original data but not include the elements that expose a risk of potential compromise.

In typical implementations, tokens are generated by authorized entities called Token Service Providers (TSPs) often at the request of entities called Token Requestors (TR). TSPs maintain the highest levels of security and are primary facilitators of this secure ecosystem by managing token generation as well as token encrypting and decrypting services. Consequently, tokenization minimizes Payment Card Industry (PCI) compliance obligations because a merchant does not have to manage consumer financial account information and the risks associated with losing that data. Thus, tokenization increases overall security and integrity of the payment ecosystem. With the increasing acceptance of tokenization, a new problem has emerged with regard to managing reward and loyalty program in payment systems.

BRIEF DESCRIPTION OF THE DRAWINGS

FIG. 5 is an illustration of the PRI Database of FIG. 1, in accordance with an embodiment.

FIG. 6 is an illustration of the Rewards Database of FIG. 1, in accordance with an embodiment.

DETAILED DESCRIPTION

Figure 1:
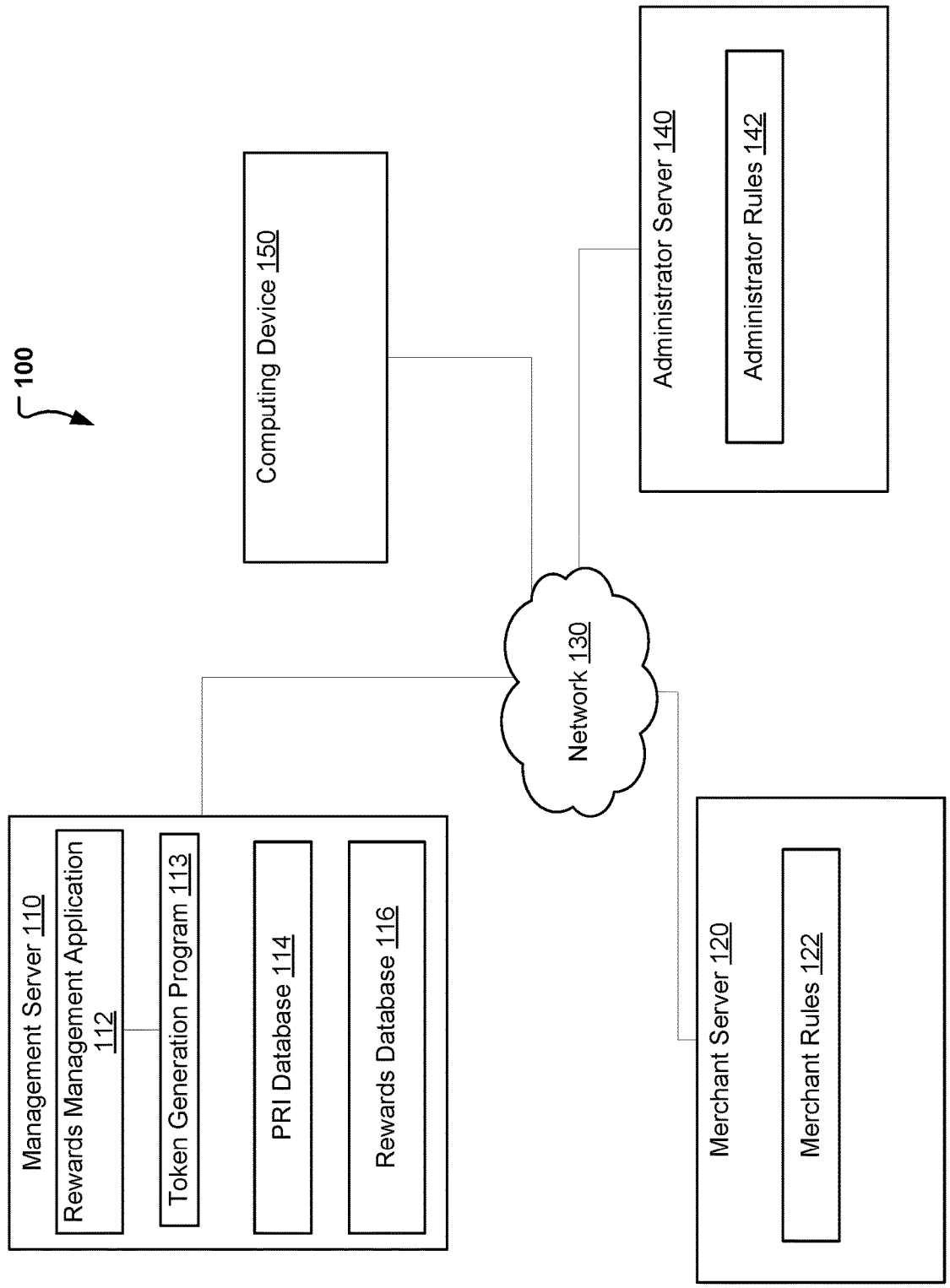
FIG. 1 illustrates a rewards management system, in accordance with an embodiment.

Embodiments of the present disclosure provide a system, method, and program product. A computer system detects the reception of a first token associated with a first transaction involving a user. The computer system determines that a first Payments Reward Identifier (PRI) is associated with the first token by accessing a PRI database and identifying that a value of the first token corresponds to a record in the PRI database that is associated with the first PRI. In response to determining that the first PRI is associated with the first token, the computer system accesses the PRI database and determines that the first PRI is associated with a record within the PRI database that corresponds to a first rewards ID (RID). In response to determining that the first PRI is associated with a record within the PRI database that corresponds to the first rewards, the computer system determines a first rewards amount corresponding to the first transaction, and updates a total rewards amount, in a rewards database, corresponding to the determined first RID based on the first rewards amount.

Embodiments of the present disclosure will now be described in detail with reference to the accompanying Figures. The present disclosure describes a solution to the problem of managing merchant rewards within a tokenized ecosystem. Merchants may manage their own rewards program utilizing their own infrastructure. Alternately, Merchants may also integrate with Third-party services like Reward Program Managers (RPRI) to run their reward programs. For example, a grocery store chain may manage their own rewards program by providing customers with a savings card and monitoring transactions involving the savings card, in order to identify the amount of rewards accrued by each customer. Alternatively, the grocery store chain may outsource the management of their savings card to a third-party RPRI. Furthermore, multiple merchants may choose to participate in a single rewards program managed by a merchant participant (e.g. Plenti® Rewards, Plenti is a registered trademark of American Express Marketing & Development Corp.), and for example, maintained in a single database to track the rewards program. Either situation requires the merchant and/or the RPRI to devote assets and employees to the monitoring and tracking of their rewards program.

In the example embodiment, the present disclosure describes a solution to the problem of maintaining rewards for merchants without the cost of merchant overhead, by associating rewards identification information, such as a Payment Rewards Identifier (PRI) with payment tokens generated for a token requestor. This may allow a token service provider (TSP) to monitor rewards activity for each merchant that conducts business with the TSP. In the example embodiment, a PRI is a generated Identifier (ID), such as a randomly generated ID, that is generated by a rewards management system and then further associated with a group of payment tokens. For example, users (users of financial instruments) may register to utilize the rewards management system, and during the registration, identification information and information regarding the rewards programs that the users belong to may be collected. A PRI may then be generated by the rewards management system and associated with one or more tokens generated for the user account by the TSP. In the example embodiment, the rewards management system may generate a PRI so that it is unique to a specific user account. The rewards management system may populate a PRI database with information collected from registered users and the corresponding PRIs, and may further utilize the information to manage the rewards accounts for each registered user, whether the user has only a single rewards account with a single merchant, a single rewards account with multiple merchants, or multiple rewards accounts with multiple merchants. The utilization of PRIs by a rewards management system to manage rewards for one or more merchants is described in further detail below with reference to the Figures.

FIG. 1 illustrates rewards management system 100, in accordance with an embodiment. In an example embodiment, rewards management system 100 includes management server 110, merchant server 120, administrator server 140, and computing device 150 all interconnected via network 130.

In the example embodiment, network 130 is the Internet, representing a worldwide collection of networks and gateways to support communications between devices connected to the Internet. Network 130 may include, for example, wired, wireless or fiber optic connections. In other embodiments, network 130 may be implemented as an intranet, a local area network (LAN), or a wide area network (WAN). In general, network 130 can be any combination of connections and protocols that will support communications between management server 110, merchant server 120, and administrator server 140.

Merchant server 120 includes merchant rules 122. In the example embodiment, merchant server 120 is a computing device capable of receiving and sending data to and from other computing devices, such as management server 110, via a network, such as network 130. For example, merchant server 120 may be a desktop computer, a laptop computer, a tablet computer, a handheld device, a smart-phone, a thin client, or any other electronic device or computing system capable of receiving and sending data to and from other computing devices. Although not shown, optionally, merchant server 120 can comprise a cluster of servers executing the same software to collectively process requests as distributed by a front-end server and a load balancer. Merchant server 120 is described in more detail with reference to FIG. 7.

Merchant rules 122 is a file that describes the rewards guidelines for the merchant associated with merchant server 120. In the example embodiment, merchant rules 122 may detail an amount of points, miles, and/or cashback accrual that corresponds to an amount of currency. For example, merchant rules 122 may detail that 1 mile corresponds to every 1 dollar involved in a transaction. In additional embodiments, merchant rules 122 may also detail offers or coupons that may be associated with a specific transactional amount or transactional threshold. For example, merchant rules 122 may detail that a coupon for $10 is earned for any transaction above $500, or alternatively a coupon for $10 is earned once a user spends $500 across one or multiple transactions. The offers may additionally include non-monetary offers such as a free item, event tickets, plane tickets, hotel nights, and the like. Furthermore, merchant rules 122 may include rules to accrue or earn rewards, rules for special offers (or bonus rewards), rules associated with the expiration of rewards, rules for rewards transfers and buyouts, and the like. Merchant rules 122 are described in further detail below with regard to FIG. 2.

Administrator server 140 includes administrator rules 142. In the example embodiment, administrator server 140 is a computing device capable of receiving and sending data to and from other computing devices, such as management server 110, via a network, such as network 130. For example, administrator server 140 may be a desktop computer, a laptop computer, a tablet computer, a handheld device, a smart-phone, a thin client, or any other electronic device or computing system capable of receiving and sending data to and from other computing devices. Although not shown, optionally, administrator server 140 can comprise a cluster of servers executing the same software to collectively process requests as distributed by a front-end server and a load balancer. In the example embodiment, administrator server 140 may manage a rewards program that includes multiple merchants, for example Plenti® (Plenti is a registered trademark of American Express Marketing & Development Corp.). Administrator server 140 is described in more detail with reference to FIG. 7.

Administrator rules 142 is a file that describes the rewards guidelines for the merchant or multiple merchants associated with a rewards program being managed by the administrator of administrator server 140. In the example, embodiment, administrator rules 142 may detail an amount of points, miles, and/or cashback that corresponds to an amount of currency. For example, administrator rules 142 may detail that 1 mile corresponds to every 1 dollar involved in a transaction. In additional embodiments, administrator rules 142 may also detail offers or coupons that may be associated with a specific transactional amount or transactional threshold. For example, administrator rules 142 may detail that a coupon for $10 is earned for any transaction above $500, or alternatively a coupon for $10 is earned once a user spends $500 across one or multiple transactions. The offers may additionally include non-monetary offers such as a free item, event tickets, plane tickets, hotel nights, and the like. Administrator rules 142 are described in further detail below with regard to FIG. 2.

In the example embodiment, computing device 150 is a computing device capable of receiving and sending data to and from other computing devices, such as management server 110, via a network, such as network 130. For example, computing device 150 may be a desktop computer, a laptop computer, a tablet computer, a handheld device, a smart-phone, a thin client, or any other electronic device or computing system capable of receiving and sending data to and from other computing devices. Although not shown, optionally, computing device 150 can comprise a cluster of servers executing the same software to collectively process requests as distributed by a front-end server and a load balancer. In the example embodiment, computing device 150 is a device associated with a user registered with rewards management system 100, such a user mobile device. Computing device 150 is described in more detail with reference to FIG. 7.

Management server 110 includes rewards management application 112, PRI database 114, and rewards database 116. In the example embodiment, management server 110 is a computing device capable of receiving and sending data to and from other computing devices, such as merchant server 120, via a network, such as network 130. For example, management server 110 may be a desktop computer, a laptop computer, a tablet computer, a handheld device, a smartphone, a thin client, or any other electronic device or computing system capable of receiving and sending data to and from other computing devices. Although not shown, optionally, management server 110 can comprise a cluster of servers executing the same software to collectively process requests as distributed by a front-end server and a load balancer. Management server 110 is described in more detail with reference to FIG. 7.

PRI database 114 is a database that includes records corresponding to rewards accounts being managed by rewards management application 112. In the example embodiment, each record of PRI database 114 includes a PRI, a RID, one or more merchant IDs corresponding to the RID, one or more tokens corresponding to the PRI. Alternatively, instead of one or more merchant IDs, a record of PRI database 114 may have a (or multiple) reward program identifiers (RPI) with each specific RPI corresponding to a specific merchant or multi-merchant reward program (such as the Plenti rewards program). In the example embodiment, an RPI is a numeric or alphanumeric phrase that corresponds to (or uniquely identifies) a merchant reward program or multi-merchant rewards program. In other embodiments, PRI database 114 may include additional information, such as identification information corresponding to a rewards user associated with each respective record. In addition, in other embodiments, in situations where rewards management application 112 maps PRIs to a financial instrument (such as airline mileage or points credit card), PRI database 114 may include a financial instrument ID in place of or in addition to the RID. PRI database 114 is described in further detail below with regard to FIGS. 2 and 5.

Rewards database 116 is a database that includes records corresponding to rewards accounts being managed by rewards management application 112. In the example embodiment, rewards database 116 includes information describing an amount of rewards that have been accrued by each user. In the example embodiment, each record in rewards database 116 includes a RID and the corresponding rewards counter(s), (i.e. the amount of rewards accrued—such as miles, points, cashback, etc.). In the example embodiment, a RID is a numeric and/or alphanumeric identifier that is associated with a rewards account. For example, a RID may be a frequent flyer number, a grocery store savings card ID, or a Plenti ID. In other embodiments, rewards database 116 may include additional rewards information, such as bonus miles/points accrued, and may additionally have identifiers corresponding to offers or coupons that a rewards user has earned. While in the example embodiment rewards database 116 and PRI database 114 are separate databases, in other embodiments, the information associated with each of these databases may be kept in a single database. Rewards database 116 is described in further detail below with regard to FIGS. 2 and 6.

Token generation program 113 is capable of generating one or more tokens that correspond to one or more financial instruments, such as a credit card or a gift card. In the example embodiment, token generation program 113 creates one or more tokens in response to a request received from computing device 150. The operations of token generation program 113 are described in further detail below with regard to FIG. 2.

Rewards management application 112 is a program capable of creating a PRI that corresponds to a RID associated with a user rewards account. In the example embodiment, rewards management application 112 further associates the PRI with one or more tokens generated by token generation program 113. In the example embodiment, rewards management application 112 is partially integrated with token generation program 113, however, in other embodiments, rewards management application 112 may be fully integrated with token generation program 113, or a separate stand-alone program. In addition, in the example embodiment, rewards management application 112 is capable of determining which PRI corresponds to a token received in response to an initiation of a transaction, such as a transaction initiated by computing device 150. In other embodiments, rewards management application 112 is capable of generating one or more tokens (in response to a request) and including information corresponding to a PRI in the generated one or more tokens, or alternatively, modifying one or more tokens generated by token generation program 113 to include information corresponding to a PRI. Furthermore, following a payment transaction (such as making a purchase, or sending money) or a payment-related activity (such as adding a financial instrument into a digital wallet) and/or a non-payment activity (such as detecting the user's presence in a retail store), the rewards management application 112 is capable of identifying an amount of rewards (such as points) that corresponds to each transaction and updating rewards database 116 to reflect the identified amount of rewards. In the example embodiment, the term 'transaction' may include any actions corresponding to the accrual of rewards, such as a payment transaction, a payment-related activity (that may not involve the transfer of value), a non-payment activity (such as a referral, a share on social media, a like on social media, walking to a store, and the like). In addition, the term 'transaction' may refer to any payment activity as determined by a person who is ordinarily skilled in the art. Furthermore, rewards management application 112 is capable of reducing the accrued rewards value (such as points) when a user redeems their rewards for an item or event of value or additionally when an item purchased (and for which points were accrued) is returned.

The operations of rewards management application 112 is described in further detail below with regard to FIGS. 2 through 6.

Figure 2:
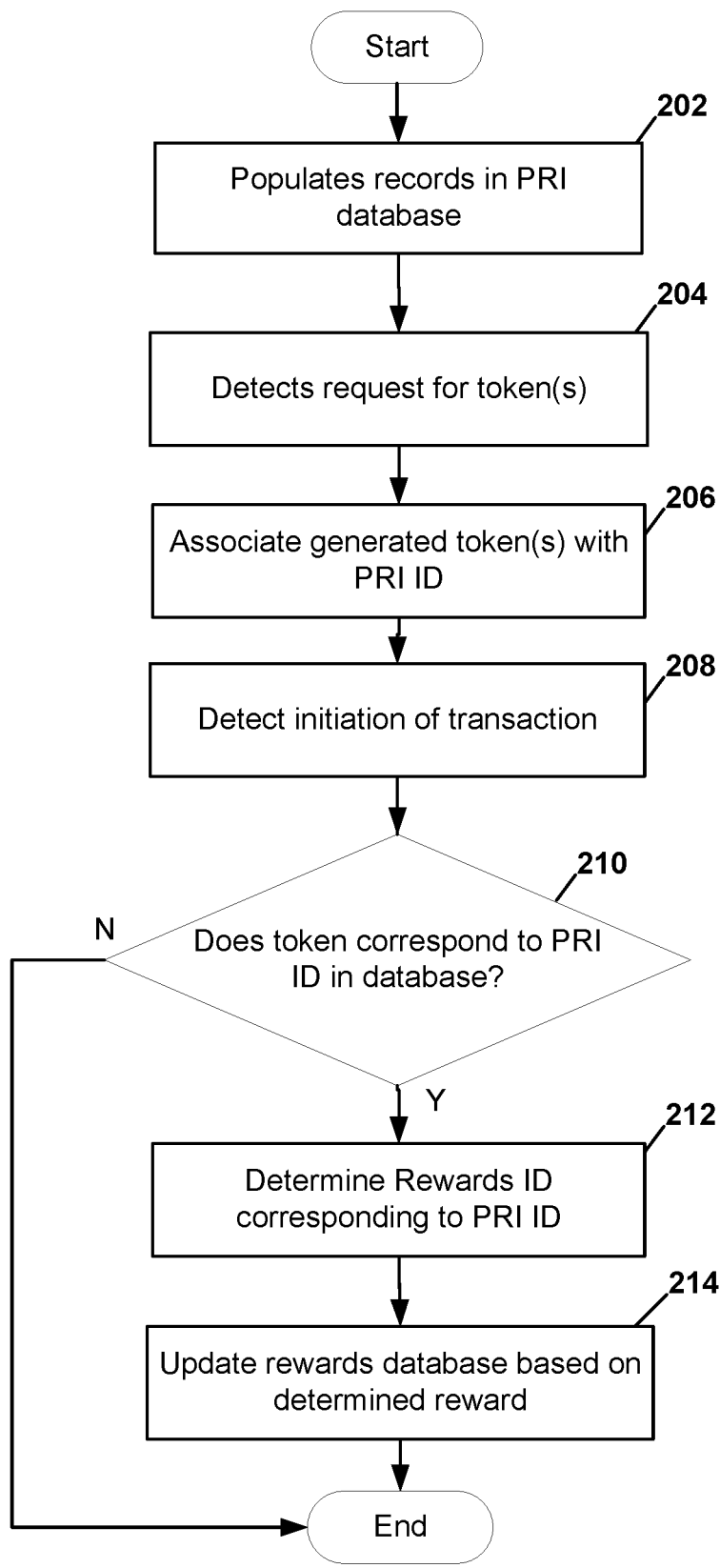
FIG. 2 is a flowchart illustrating the operations of the rewards program of FIG. 1 in utilizing a Payments Rewards Identifier (PRI) database to manage rewards account, in accordance with an embodiment.

FIG. 2 is a flowchart illustrating the operations of rewards management application 112 in utilizing PRI database 114 to manage rewards accounts, in accordance with an embodiment. In the example embodiment, rewards management application 112 populates records in PRI database 114 (step 202). In the example embodiment, during registration, rewards management application 112 prompts users for information pertaining to rewards accounts/programs that the user is involved with. For example, rewards management application 112 may present the user with a drop-down menu containing a list of rewards programs that are selectable to allow the user to select the rewards programs that he/she is a member of. In the example embodiment, rewards management application 112 may additionally request that the user input his/her rewards identification number or numbers (RIDs). In other embodiments, rewards management application 112 may communicate with a server of a merchant (or alternative manager of rewards program) that corresponds to a selected rewards program, such as merchant server 120, and utilize user identification information to request a RID (or alternatively retrieve the RID). Furthermore, rewards management application 112 may request the user to input the merchants associated with the input RIDs, while in other embodiments, rewards management application 112 may access, via network 130, rewards program information (located on a merchant or rewards program website for example) to identify merchants corresponding to the input RIDs. In the example embodiment, rewards management application 112 utilizes the received information to populate the records within PRI database 114 to include a PRI, a RID, and one or more RPIs. Furthermore, in the example embodiment, each record within PRI database 114 corresponds to a single rewards program. Therefore, a single registered user may be associated with multiple PRIs. Furthermore, a single merchant may be associated with multiple rewards programs.

In other embodiments, the merchant or the rewards provider may already have data related to a user (or multiple users) based on past interactions with the user. Rewards management application 112 may access the data by communicating with a merchant (or reward provider) server and utilize the data to populate rewards database 116 accordingly. Examples of data that may be utilized to track user behavior are geolocation, unique device identifiers, browser cookies, application instance identifiers, biometric identifiers, and additional mechanisms recognized by a person with ordinary skill in the art.

Rewards management application 112 detects a request, received by token generation program 113, for one or more tokens from a device, such as computing device 150, of a registered user (step 204). In the example embodiment, rewards management application 112 detects the request by way of being partially integrated with token generation program 113. In additional embodiments, the request may be received by rewards management application 112. In response to the request from the device of the registered user, token generation program 113 generates the one or more tokens for transmission to the device of the registered user, however in other embodiments, rewards management application 112 may generate the one or more tokens. In another embodiment, rewards management application 112 may detect a request for one or more tokens, received by token generation program 113 from a point of sale device, and initiated by an EMV card action, such as a swipe, insertion or tap of the EMV card. While in the example embodiment, token generation program 113 and rewards management application 112 are controlled by the same entity (rewards manager), in other embodiments, token generation program 113 may be controlled by a separate entity and be utilized by rewards management application 112 to create and utilize tokens.

Rewards management application 112 associates the generated one or more tokens with a PRI associated with a RID of the registered user by storing the values of the one or more tokens in the record of PRI database 114 corresponding to the PRI associated with the RID of the registered user (step 206). In the example embodiment, rewards management application 112 generates a PRI, which for example, includes a randomly generated number or alphanumeric sequence, with the PRI being unique to a specific RID of the registered user. Once the one or more generated tokens have been associated with the PRI in the respective record of PRI database 114, token generation program 113 (or alternatively, rewards management application 112) may then transmit the generated one or more tokens to the device of the registered user (computing device 150). In the example embodiment, this process may be repeated for a plurality of rewards programs of the registered user and additionally for rewards programs corresponding to other registered users until a plurality of PRIs are associated with one or more token values within PRI database 114. For example, if the registered user is associated with two rewards programs (and therefore has two RIDs in PRI database 114), rewards management application 112 may associate, within PRI database 114, a first set of tokens with a first PRI corresponding to the first RID and associate a second set of tokens with a second PRI corresponding to the second RID.

Rewards management application 112 detects the initiation of a transaction by a device of the registered user (step 208). In the example embodiment, rewards management application 112 detects the initiation of a transaction by receiving a token. Rewards management application 112 then performs a lookup within PRI database 114 to determine whether the received token corresponds to a PRI in PRI database 114 (decision 210). As stated above, rewards management application 112 associates tokens generated by token generation program 113 in response to a request by a registered user, with a PRI associated with the registered user. Rewards management application 112 determines if the received token value matches any stored token value in PRI database 114. If rewards management application 112 determines that the received token does not correspond to a PRI in PRI database 114 (decision 210, "NO" branch), rewards management application 112 continues to monitor for received tokens.

If rewards management application 112 determines that the received token does correspond to a PRI in PRI database 114 (decision 210, "YES" branch), rewards management application 112 determines the RID that corresponds to the determined PRI by referencing PRI database 114 (step 212). In the example embodiment, a RID corresponds to a specific rewards program offered by a merchant or a group of merchants. For example, as stated above, a RID may correspond to a airlines miles program, such as a frequent flier program, associated with a single airline, or may correspond to a rewards program that corresponds to multiple merchants, such as Plenti.

Rewards management application 112 updates the record in rewards database 116 that corresponds to the determined RID based on the detected transaction (step 214). In the example embodiment, once rewards management application 112 determines the corresponding RID, rewards management application 112 identifies a merchant associated with the rewards program corresponding to the determined RID. Rewards management application 112 communicates with the merchant server of the identified merchant, such as merchant server 120 in order to identify merchant rules, such as merchant rules 122, that detail the amount of rewards that should be awarded for a given situation (and transaction). For example, rewards management application 112 may identify that an airline corresponds to the determined RID, and therefore, communicates with a server of the airline to identify the amount of miles to award the user based on the detected transaction. In another example, rewards management application 112 may determine that a rewards program that is associated with multiple merchants corresponds to the determined RID. In this example, rewards management application 112 communicates with a server, such as administrator server 140, which corresponds to the administrator of the rewards program. Rewards management application 112 may then reference administrator rules 142 to identify the amount of rewards to award the user based on the detected transaction. In a further example, administrator server 140 may be an administrator for a rewards program outsourced by a single merchant. In this further example, rewards management application 112 may reference administrator rules 142 to identify the amount of rewards to award the user based on the detected transaction.

In other embodiments, rewards management application 112 may transmit a request to merchant server 120 or administrator server 140 for specific merchant (or administrator) rules pertaining to the detected transaction. In further embodiments, rewards management application 112 may download the merchant (or administrator) rules in their entirety via network 130, and reference the rules locally as needed. Additionally, merchant rules 122 and/or administrator rules 142 may include rules that detail an amount of rewards to award a user based on a total transactional amount to date (or during a certain period of time). Furthermore, merchant rules 122 and/or administrator rules 142 may include rules that detail rewards, offers and/or coupons to award a user based on a total transactional amount (to date or during a certain period of time) and/or based on the details of the current detected transaction (the transactional amount or item(s) being purchased). Therefore, rewards management application 112 may maintain a total transactional amount corresponding to each PRI, and may further identify specifics of the current transaction in order to determine if the user qualifies for any additional rewards, coupons or offers.

Rewards management application 112 then updates rewards database 116 based on the determined amount of rewards that corresponds to the detected transaction. In addition, rewards management application 112 may update rewards database 116 based on additional rewards, coupons, or offers earned by the user associated with the detected transaction determined as described above. In the example embodiment, rewards management application 112 updates a record within rewards database 116 that is associated with the determined RID. The records of rewards database 116 may be shared or transmitted by rewards management application 112 to merchant/administrator servers, such as merchant server 120 or administrator server 140 so that the accumulated rewards may be paid out to the relevant user. Furthermore, rewards management application 112 may transmit a notification to the device of the registered user (computing device 150) detailing the rewards, coupons, and offers earned by the registered user. In another embodiment, reward management application 112 may transmit coupons, offers (and additionally rewards) to the device of the registered user. In other embodiments, the rewards may be paid out by an administrator of management server 110, in which case the administrator of management server 110 may be reimbursed by the merchant or administrator associated with the managed rewards programs.

In an additional embodiment, rather than associating the generated one or more tokens with a PRI associated with the registered user, rewards management application 112 may create the one or more tokens with information detailing the PRI included within the one or more tokens. Therefore, when a token is received at the time of transaction, rewards management application 112 may analyze the token and identify the PRI from the information contained within the token. Rewards management application 112 may then reference PRI database 114 in order to determine a RID corresponding to the identified PRI, and further update rewards database 116 in a similar manner as discussed above. In another embodiment, rewards management application 112 may encode the PRI and include the encoded PRI within the created token. In this embodiment, rewards management application 112 may maintain mapping between the encoded PRI and the algorithm utilized to perform the encoding. Therefore, based on identifying the encoded PRI, rewards management application 112 may refer to the mapping to determine the algorithm to utilize for the purposes of decoding. In other embodiments, rewards management application 112 may encrypt the PRI (and maintain the corresponding key in association with the PRI) or utilize hashing or obfuscating techniques to secure the PRI from being identified by another party.

In a further embodiment, rather than associating the generated one or more tokens with a PRI associated with the registered user, rewards management application 112 may detect the generation of one or more tokens by token generation program 113 or alternatively, may detect the generation of one or more tokens by a third party server (or receive one or more generated tokens from a third party server). Rewards management application 112 may further receive or intercept the generated one or more tokens (for example intercept the communication as the tokens are being transmitted from the third party server to the token requestor). Rewards management application 112 may then modify the one or more tokens to include information detailing the PRI. Therefore, when a token is received at the time of transaction, rewards management application 112 may analyze the token and identify the PRI from the information contained within the token. Rewards management application 112 may then reference PRI database 114 in order to determine a RID corresponding to the identified PRI, and further update rewards database 116 in a similar manner as discussed above.

The process described in FIG. 2 may be utilized to manage multiple rewards accounts for a single user. For example, rewards management application 112 may associate a second group of tokens generated in response to a request from a device of the user, with a second PRI (that corresponds to a separate rewards program from the rewards program described in the example embodiment). Rewards management application 112 may, upon reception of a second token (or alternatively detection of reception of second token by token generation program 113), perform a lookup within PRI database 114 to determine that the received second token value corresponds to the second PRI, and further determine the RID that corresponds to the second PRI. Rewards management application 112 may then update the record in rewards database 116 that corresponds to the determined RID based on the detected transaction. Therefore, a record corresponding to a second rewards program of the user is updated based on reception of a token from the second group of tokens.

In other embodiments, a token may be associated with multiple PRIs, and therefore, when utilized may result in the accrual of rewards points for multiple programs. For example, a single transaction utilizing a single token may result in accrual of rewards points for a grocery store chain while also accruing cashback corresponding to a payment card.

In addition, the process described in FIG. 2 may be utilized to manage the accrual or redemption of rewards. For example, rewards management application 112 may detect a redemption initiated by a user device, such as computing device 140, or alternatively, a point of sale device, or alternative computing device. As stated above, rewards management application 112 may associate a first group of tokens generated in response to a request from a device of the user, with a first PRI (that corresponds to a rewards program). Rewards management application 112 may, upon reception of a token from the first group of tokens (or alternatively detection of reception of a token from the first group of tokens by token generation program 113), perform a lookup within PRI database 114 to determine that the received token value corresponds to the first PRI, and further determine the RID that corresponds to the first PRI. Rewards management application 112 may then update the record in rewards database 116 that corresponds to the determined RID based on the detected transaction. For instance, in this example, rewards management application 112 may update the record in rewards database 116 to reflect a reduction in rewards (points, miles, etc) that corresponds to the redemption. In situations where an expiration of rewards occurs, rewards management application 112 may reference merchant rules 122 to identify the rules that govern the expiration of rewards for a specific rewards program. If according the merchant rules 122, any of the rewards in the corresponding rewards program has expired, rewards management application 112 may update the appropriate record in rewards database 116 to reflect the expiration.

In another embodiment, rewards management application 112 may additionally run the rewards program for one or more merchants including the onboarding process into the rewards program. For example, rewards management application 112 may onboard a user by receiving user identification information from a device of the user or an alternative device, and further store the user identification information in a digital wallet database. In this embodiment, rewards management application 112 may generate a unique RID and associate the user identification information with the RID within a record in the digital wallet database, and may further associate the user identification information and RID with an RPI that corresponds to the merchant (or merchant if a multi-merchant rewards program). The information in the digital wallet database may be referenced by rewards management application 112 when needed. Additionally, rewards management application 112 may update a rewards amount associated with the record in the digital wallet database to coincide with rewards accumulated (or redeemed) by users of the corresponding rewards program. In one embodiment, a separate digital wallet database may be maintained for each merchant (or group of related merchants in the case of a multi-merchant rewards program).

Figure 3:
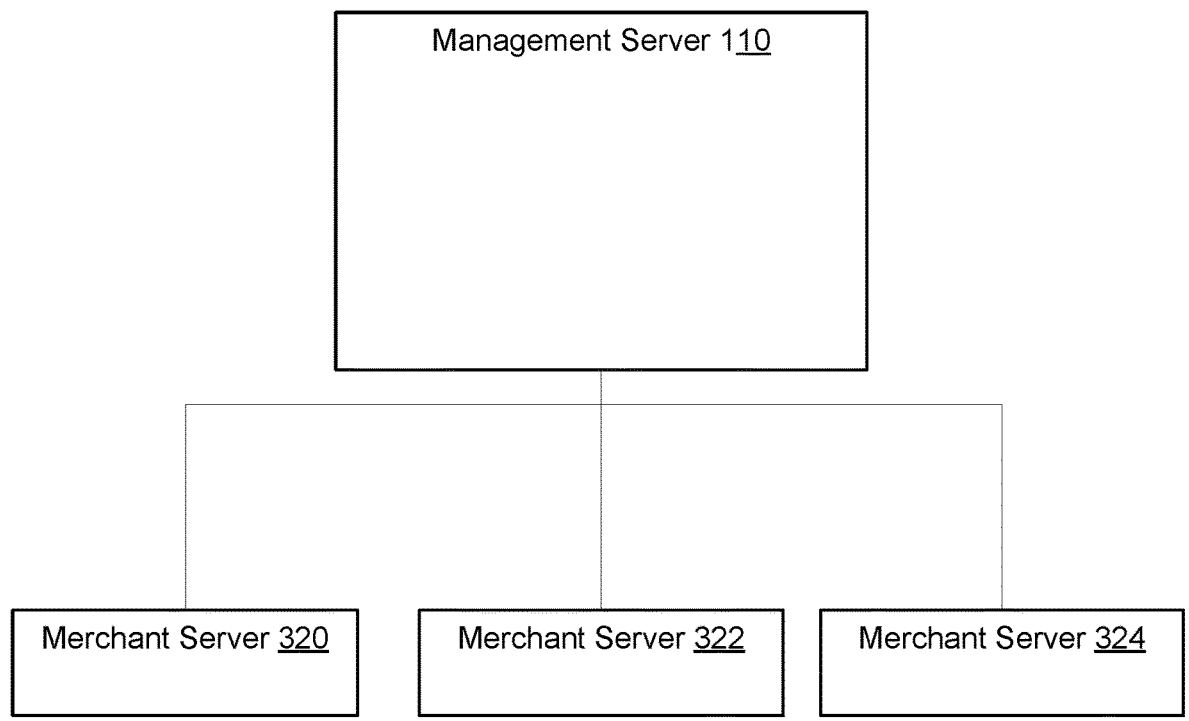
FIG. 3 is an illustration of the management server of FIG. 1 managing rewards programs corresponding to multiple merchants for a single user or a plurality of users, in accordance with an embodiment.

FIG. 3 is an illustration of management server 110 managing multiple rewards programs corresponding to multiple merchants for a single user or a plurality of users, in accordance with an embodiment. In the example embodiment, as described above, rewards management application 112 on management server 110 may maintain a PRI for each rewards program associated with a registered user. For example, in this illustration, rewards management application 112 may maintain a separate PRI for each of merchant server 320, merchant server 322, and merchant server 324. Therefore, when a token is received corresponding to a transaction with a merchant, rewards management application 112 can utilize PRI information associated with the token to determine the rewards program/RID (if any) that corresponds to the transaction, and update a record in rewards database 116 corresponding to the determined rewards program.

Figure 4:
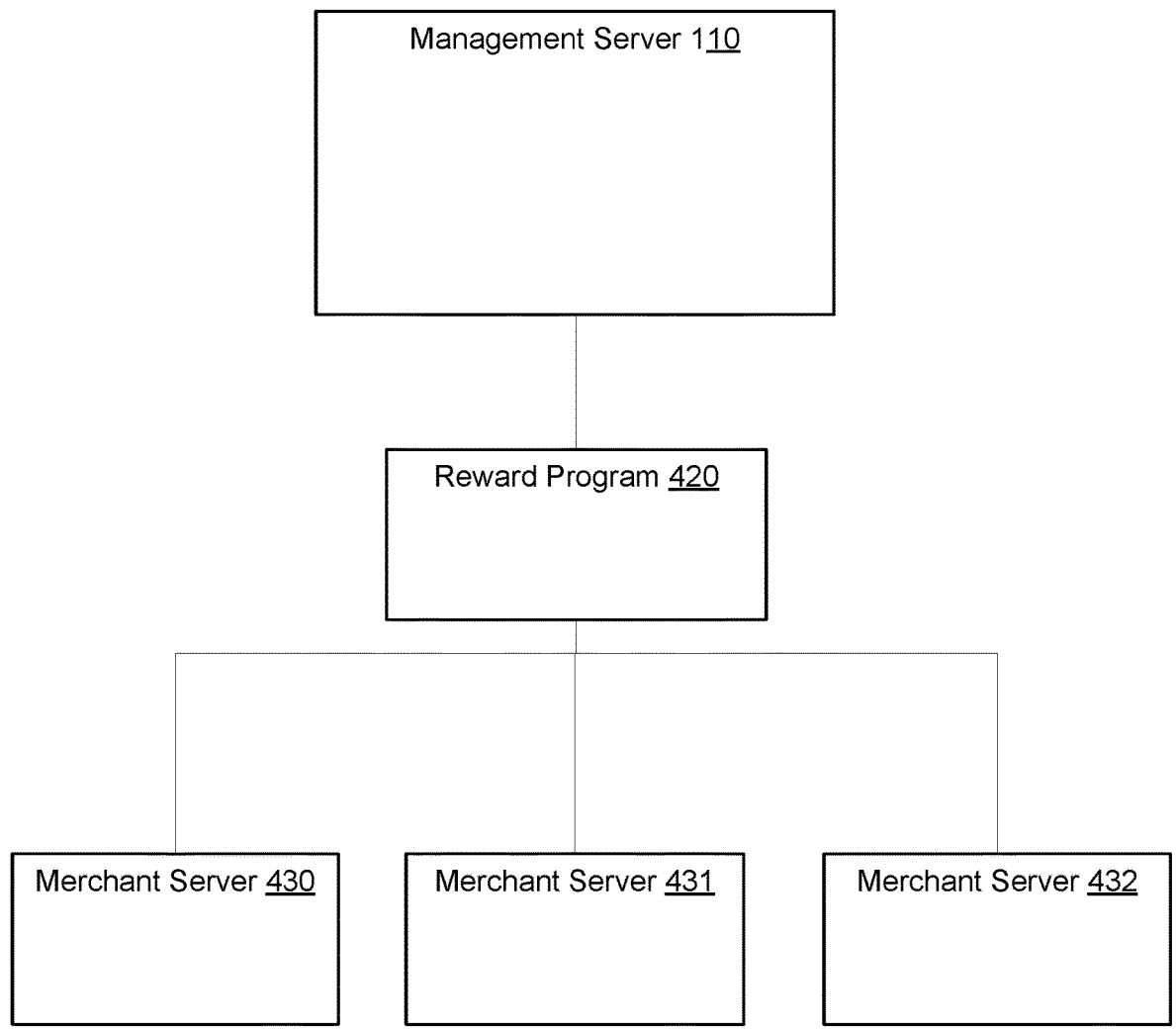
FIG. 4 is an illustration of the management server of FIG. 1 managing a rewards program that corresponds to multiple merchants, in accordance with an embodiment.

FIG. 4 is an illustration of management server 110 managing a rewards program that corresponds to multiple merchants. In this embodiment, rewards management application 112 creates a PRI for rewards program 420, which corresponds to merchant server 430, merchant server 431, and merchant server 432. Therefore, if rewards management application 112 receives a token corresponding to a transaction associated with merchant server 430, merchant server 431, and merchant server 432, rewards management application 112 will identify update a record in rewards database 116 that corresponds to the PRI created for rewards program 420.

FIG. 5 is an illustration of PRI database 114, in accordance with an embodiment. In the example embodiment, PRI database 114 includes a plurality of records with each record including a PRI, a RID, one or more RPIs, and one or more token values. In other embodiments, PRI database 114 may have additional information.

FIG. 6 is an illustration of rewards database 116, in accordance with an embodiment. In the example embodiment, rewards database 116 includes a plurality of records, with each record including RID and an amount of rewards accrued. In other embodiments, rewards database 116 may include additional information. As stated above, rewards management application 112 may update the amount of rewards accrued corresponding to a specific record upon based on detected transactions as described above.

The foregoing description of various embodiments of the present disclosure has been presented for purposes of illustration and description. It is not intended to be exhaustive nor to limit the disclosure to the precise form disclosed. Many modifications and variations are possible. Such modifications and variations that may be apparent to a person skilled in the art of the disclosure are intended to be included within the scope of the disclosure.

Figure 7:
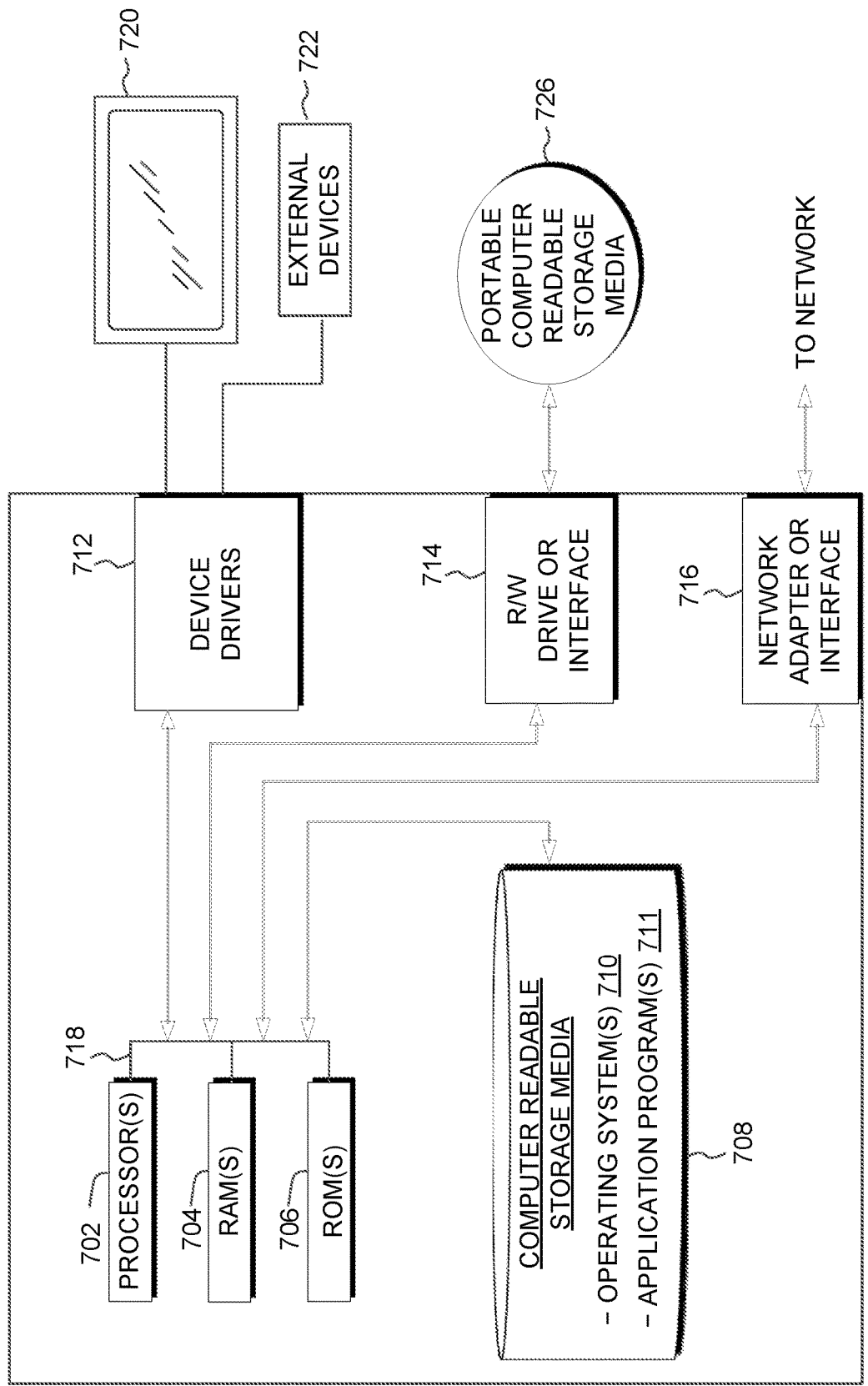
FIG. 7 is a block diagram depicting the hardware components of the rewards management system of FIG. 1, in accordance with an embodiment.

FIG. 7 depicts a block diagram of components of computing devices contained in rewards management system 100 of FIG. 1, in accordance with an embodiment. It should be appreciated that FIG. 7 provides only an illustration of one implementation and does not imply any limitations with regard to the environments in which different embodiments may be implemented. Many modifications to the depicted environment may be made.

Computing devices may include one or more processors 702, one or more computer-readable RAMs 704, one or more computer-readable ROMs 706, one or more computer readable storage media 708, device drivers 712, read/write drive or interface 714, network adapter or interface 716, all interconnected over a communications fabric 718. Communications fabric 718 may be implemented with any architecture designed for passing data and/or control information between processors (such as microprocessors, communications and network processors, etc.), system memory, peripheral devices, and any other hardware components within a system.

One or more operating systems 710, and one or more application programs 711, for example, reward management application 112, are stored on one or more of the computer readable storage media 708 for execution by one or more of the processors 702 via one or more of the respective RAMs 704 (which typically include cache memory). In the illustrated embodiment, each of the computer readable storage media 708 may be a magnetic disk storage device of an internal hard drive, CD-ROM, DVD, memory stick, magnetic tape, magnetic disk, optical disk, a semiconductor storage device such as RAM, ROM, EPROM, flash memory or any other computer-readable tangible storage device that can store a computer program and digital information.

Computing devices may also include a R/W drive or interface 714 to read from and write to one or more portable computer readable storage media 726. Application programs 711 on the computing devices may be stored on one or more of the portable computer readable storage media 726, read via the respective R/W drive or interface 714 and loaded into the respective computer readable storage media 708.

Computing devices may also include a network adapter or interface 716, such as a TCP/IP adapter card or wireless communication adapter (such as a 4G wireless communication adapter using OFDMA technology). Application programs 711 on the computing devices may be downloaded to the computing devices from an external computer or external storage device via a network (for example, the Internet, a local area network or other wide area network or wireless network) and network adapter or interface 716. From the network adapter or interface 716, the programs may be loaded onto computer readable storage media 708. The network may comprise copper wires, optical fibers, wireless transmission, routers, firewalls, switches, gateway computers and/or edge servers.

Computing devices may also include a display screen 720, and external devices 722, which may include, for example a keyboard, a computer mouse and/or touchpad. Device drivers 712 interface to display screen 720 for imaging, to external devices 722, and/or to display screen 720 for pressure sensing of alphanumeric character entry and user selections. The device drivers 712, R/W drive or interface 714 and network adapter or interface 716 may comprise hardware and software (stored on computer readable storage media 708 and/or ROM 706).

The programs described herein are identified based upon the application for which they are implemented in a specific embodiment. However, it should be appreciated that any particular program nomenclature herein is used merely for convenience, and thus the disclosure should not be limited to use solely in any specific application identified and/or implied by such nomenclature.

Based on the foregoing, a computer system, method, and computer program product have been disclosed. However, numerous modifications and substitutions can be made without deviating from the scope of the present disclosure. Therefore, the various embodiments have been disclosed by way of example and not limitation.

Various embodiments of the present disclosure may be a system, a method, and/or a computer program product. The computer program product may include a computer readable storage medium (or media) having computer readable program instructions thereon for causing a processor to carry out aspects of the present disclosure.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punchcards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present disclosure may be assembler instructions, instruction-set-architecture (ISA) instructions, machine instructions, machine dependent instructions, microcode, firmware instructions, state-setting data, configuration data for integrated circuitry, or either source code or object code written in any combination of one or more programming languages, including an object oriented programming language such as Smalltalk, C++, or the like, and procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present disclosure.

Aspects of the present disclosure are described herein with reference to flowchart illustrations and/or block diagrams of methods, apparatus (systems), and computer program products according to embodiments of the disclosure. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present disclosure. In this regard, each block in the flowchart or block diagrams may represent a module, segment, or portion of instructions, which comprises one or more executable instructions for implementing the specified logical function(s). In some alternative implementations, the functions noted in the blocks may occur out of the order noted in the Figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

What is claimed is:

1. A rewards platform, comprising:
   one or more processors, one or more computer-readable memories, with program instructions stored on the one or more computer-readable memories, the one or more processors configured to execute the program instructions to cause the rewards platform to perform operations comprising:
      generating one or more records in a rewards database based at least on an input provided by a user, wherein each of the one or more records corresponds to one or more rewards programs, wherein the one or more records are separately identifiable by one or more unique rewards identifier numbers, and wherein the one or more records and the one or more rewards programs correspond to a plurality of different entities;
      generating one or more payment tokens that correspond to respective one or more financial instruments, wherein each of the one or more payment tokens is associated with a respective record of the one or more records, wherein the one or more payment tokens are separately identifiable by one or more unique payment rewards identifiers, and wherein each of the one or more unique payment rewards identifiers is encoded based on a specified algorithm;
      transmitting the generated one or more payment tokens to a user device of the user;
      detecting an initiation of a transaction by the user device, wherein the detecting the initiation of the transaction includes:
         decoding, based on the specified algorithm, one of the unique payment rewards identifiers associated with the transaction; and
         identifying, based on the decoded one of the unique payment rewards identifiers, a first payment token of the one or more payment tokens;
      determining that the first payment token corresponds to the unique rewards identifier number that identifies a first record of the one or more records; and
      based on the determining, updating a rewards amount in the first record based on information associated with the transaction.

2. The rewards platform of claim 1, wherein the generating the one or more records in the rewards database is further based on retrieving information corresponding to the one or more rewards programs from one or more servers associated with the plurality of different entities.

3. The rewards platform of claim 1, wherein the generating the one or more records in the rewards database is further based on tracking user behavior and geolocation information of the user and determining, based on the tracking, that the one or more rewards programs correspond to the user.

4. The rewards platform of claim 1, wherein the generating the one or more payment tokens is based on detecting a request for the one or more payment tokens received from the user device.

5. The rewards platform of claim 1, wherein each of the one or more unique payment rewards identifiers corresponds to a store savings program or an airline frequent flyer number.

6. The rewards platform of claim 1, the operations further comprising:
   determining that the first payment token corresponds to a second record of the one or more records; and
   based on the determining that the first payment token corresponds to a second record of the one or more records, updating a rewards amount in the second record based on the information associated with the transaction, wherein the first record corresponds to a first entity of the plurality of different entities and the second record corresponds to a second entity of the plurality of different entities.

7. The rewards platform of claim 1, wherein the updating the rewards amount in the first record based on the information associated with the transaction includes communicating with an entity of the plurality of different entities that corresponds to the first record, and wherein the updating the rewards amount is based on information received from the entity during the communicating.

8. A method comprising:
   generating one or more records in a rewards database based at least on an input provided by a user, wherein each of the one or more records corresponds to one or more rewards programs, wherein each of the one or more records is uniquely identifiable by a respective unique rewards identifier, and wherein the one or more records and the one or more rewards programs correspond to a plurality of different entities;
   generating one or more payment tokens that correspond to respective one or more financial instruments, wherein each of the one or more payment tokens is associated with a respective record of the one or more records, wherein each of the one or more payment tokens is uniquely identifiable by a respective payment rewards identifier that is encoded based on a specified algorithm;
   transmitting the generated one or more payment tokens to a user device of the user;
   detecting an initiation of a transaction by the user device, wherein the detecting the initiation of the transaction includes:
      decoding, based on the specified algorithm, the respective payment rewards identifier associated with the transaction; and identifying, based on the decoded respective payment rewards identifier, a first payment token of the one or more payment tokens;

determining that the first payment token corresponds to the respective unique rewards identifier that identifies a first record of the one or more records; and based on the determining, updating a rewards amount in the first record based on information associated with the transaction.

9. The method of claim 8, wherein the generating the one or more records in the rewards database is further based on communicating with one or more servers associated with the plurality of different entities and retrieving, based on the communicating, information corresponding to the one or more rewards programs.

10. The method of claim 8, wherein the generating the one or more records in the rewards database is further based on determining that the one or more rewards programs correspond to the user based on tracking user behavior and geolocation information of the user.

11. The method of claim 8, wherein the generating the one or more payment tokens is based on detecting a request for the one or more payment tokens received from the user device.

12. The method of claim 8, wherein each of the one or more unique payment rewards identifiers corresponds to a store savings program or an airline frequent flyer number.

13. The method of claim 8, further comprising:

determining that the first payment token corresponds to a second record of the one or more records; and based on determining that the first payment token corresponds to a second record of the one or more records, updating a rewards amount in the second record based on the information associated with the transaction, wherein the first record corresponds to a first entity of the plurality of different entities and the second record corresponds to a second entity of the plurality of different entities.

14. The method of claim 8, wherein the updating the rewards amount in the first record based on the information associated with the transaction includes communicating with an entity of the plurality of different entities that corresponds to the first record, and wherein the updating the rewards amount is based on information received from the entity during the communicating.

15. A computer program product comprising:

one or more computer-readable tangible storage devices, and program instructions stored on at least one of the one or more computer-readable tangible storage devices, the program instructions when executed cause a machine to perform operations comprising:

accessing one or more records in a rewards database, wherein the one or more records are based at least on an input provided by a user, wherein each of the one or more records corresponds to one or more rewards programs, wherein each of the one or more records corresponds to a different unique rewards identifier, and wherein the one or more records and the one or more rewards programs correspond to a plurality of different entities;

generating one or more payment tokens that correspond to respective one or more financial instruments, wherein each of the one or more payment tokens is associated with a respective record of the one or more records, wherein each of the one or more payment tokens corresponds to a different encoded payment rewards identifier;

transmitting the generated one or more payment tokens to a user device of the user;

detecting an initiation of a transaction by the user device, the transaction including a specified payment rewards identifier, wherein the detecting the initiation of the transaction includes:

decoding the specified encoded payment rewards identifier included in the transaction; and identifying, based on the decoded specified payment rewards identifier, a first payment token of the one or more payment tokens;

determining that the first payment token corresponds to the unique rewards identifier that corresponds to a first record of the one or more records; and in response to the determining, updating a rewards amount in the first record based on an information associated with the transaction.

16. The computer program product of claim 15, wherein the one or more records in the rewards database is further based on information corresponding to the one or more rewards programs retrieved from one or more servers associated with the plurality of different entities.

17. The computer program product of claim 15, wherein the one or more records in the rewards database is further based on a determination that the one or more rewards programs correspond to the user based on tracking user behavior and geolocation information of the user.

18. The computer program product of claim 15, wherein the generating the one or more payment tokens is based on detecting a request for the one or more payment tokens received from the user device.

19. The computer program product of claim 15, wherein each of the one or more unique rewards identifiers corresponds to a store savings program or an airline frequent flyer number.

20. The computer program product of claim 15, the operations further comprising:

determining that the first payment token corresponds to a second record of the one or more records; and based on the determining that the first payment token corresponds to a second record of the one or more records, updating a rewards amount in the second record based on the information associated with the transaction, wherein the first record corresponds to a first entity of the plurality of different entities and the second record corresponds to a second entity of the plurality of different entities.

\* \* \* \* \*

UNITED STATES PATENT AND TRADEMARK OFFICE
CERTIFICATE OF CORRECTION

PATENT NO. : 11,935,087 B2
APPLICATION NO. : 17/021356
DATED : March 19, 2024
INVENTOR(S) : Avik Chatterjee and Srivathsan Narasimhan It is certified that error appears in the above-identified patent and that said Letters Patent is hereby corrected as shown below:

In the Specification

Column 2, Lines 33-55 should read as follows:
Embodiments of the present disclosure will now be described in detail with reference to the accompanying Figures. The present disclosure describes a solution to the problem of managing merchant rewards within a tokenized ecosystem. Merchants may manage their own rewards program utilizing their own infrastructure. Alternately, Merchants may also integrate with Third-party services like Reward Program Managers (RPM) to run their reward programs. For example, a grocery store chain may manage their own rewards program by providing customers with a savings card and monitoring transactions involving the savings card, in order to identify the amount of rewards accrued by each customer. Alternatively, the grocery store chain may outsource the management of their savings card to a third-party RPM. Furthermore, multiple merchants may choose to participate in a single rewards program managed by a merchant participant (e.g. Plenti® Rewards, Plenti is a registered trademark of American Express Marketing & Development Corp.), and for example, maintained in a single database to track the rewards program. Either situation requires the merchant and/or the RPM to devote assets and employees to the monitoring and tracking of their rewards program.

Signed and Sealed this
Seventh Day of May, 2024

Katherine Kelly Vidal
*Director of the United States Patent and Trademark Office*